March 25, 1941.  G. E. MARKLEY  2,236,341

VIBRATORY MATERIAL HANDLING SCREEN MECHANISM

Filed Jan. 29, 1937  5 Sheets-Sheet 1

INVENTOR.
George E. Markley.
BY Slough and Canfield
ATTORNEY.

March 25, 1941.  G. E. MARKLEY  2,236,341
VIBRATORY MATERIAL HANDLING SCREEN MECHANISM
Filed Jan. 29, 1937  5 Sheets-Sheet 2

INVENTOR.
George E. Markley.
BY
Slough and Canfield
ATTORNEY.

March 25, 1941.  G. E. MARKLEY  2,236,341

VIBRATORY MATERIAL HANDLING SCREEN MECHANISM

Filed Jan. 29, 1937  5 Sheets-Sheet 5

BY George E. Markley
INVENTOR.
Slough and Canfield ATTORNEY.

Patented Mar. 25, 1941

2,236,341

UNITED STATES PATENT OFFICE 2,236,341

VIBRATORY MATERIAL HANDLING SCREEN MECHANISM

George E. Markley, Cleveland Heights, Ohio

Application January 29, 1937, Serial No. 123,027

10 Claims. (Cl. 209—326)

This invention relates to vibratory screening apparatus for screening comminuted materials, and particularly to mechanism for supporting a screen in a manner to permit it to be rapidly vibrated, and for vibrating it.

Among the disadvantages of prior vibratory screens of this class are that the vibrations of the screen itself are transmitted through the supporting frame to the floor or other part of the building in which it is mounted. Another disadvantage is that, particularly in screen mechanisms in which the screen is moved in a closed path of movement, bearings are utilized and such bearings rapidly deteriorate due to the presence of abrasive material in the atmosphere surrounding the bearings which inevitably is present when abrasive material is being screened. Another objection to prior vibratory screens is their inadaptability to be converted from one path of vibratory movement to another to adapt the screen to the screening of different classes of materials.

It is therefore an object of this invention to provide an improved vibratory screening mechanism of the class referred to.

Another object is to provide an improved vibratory screening mechanism adapted to be vibrated in an improved manner by electro-magnetic means.

Another object is to provide an improved mechanism for supoprting a vibratory screen.

Another object is to provide a vibratory material handling screening apparatus having improved means for absorbing kinetic energy of the moving screen and associated parts to prevent or reduce transmission of vibration to the supporting frame, floor or the like upon which the apparatus is mounted.

Another object is to provide an apparatus whereby a primary load, such for example as a material handling vibratory screen, and a secondary load, such for example as a mass of heavy material, may be vibratingly moved in correspsonding directions so that the kinetic energy of the one may counteract or substantially absorb the kinetic energy of the other in an improved manner.

Another object is to provide an improved frictionless oscillatory bearing construction for oscillatingly supporting mechanism elements, such for example as the vibratory screen of a vibratory material handling screening apparatus.

Another object is to provide an improved oscillatory bearing support for mechanism elements adaptable to support vibratory screening apparatus in which the bearing parts have no relative sliding movement upon each other whereby friction and wear is completely prevented.

Another object is to provide a vibratory screening apparatus wherein the path of vibratory movement of the screen may be readily converted from one form of path to another.

Other objects will be apparent to those skilled in the art to which my invention appertains.

My invention is fully disclosed in the following description taken in connection with the accompanying drawings, in which.

Figure 4:
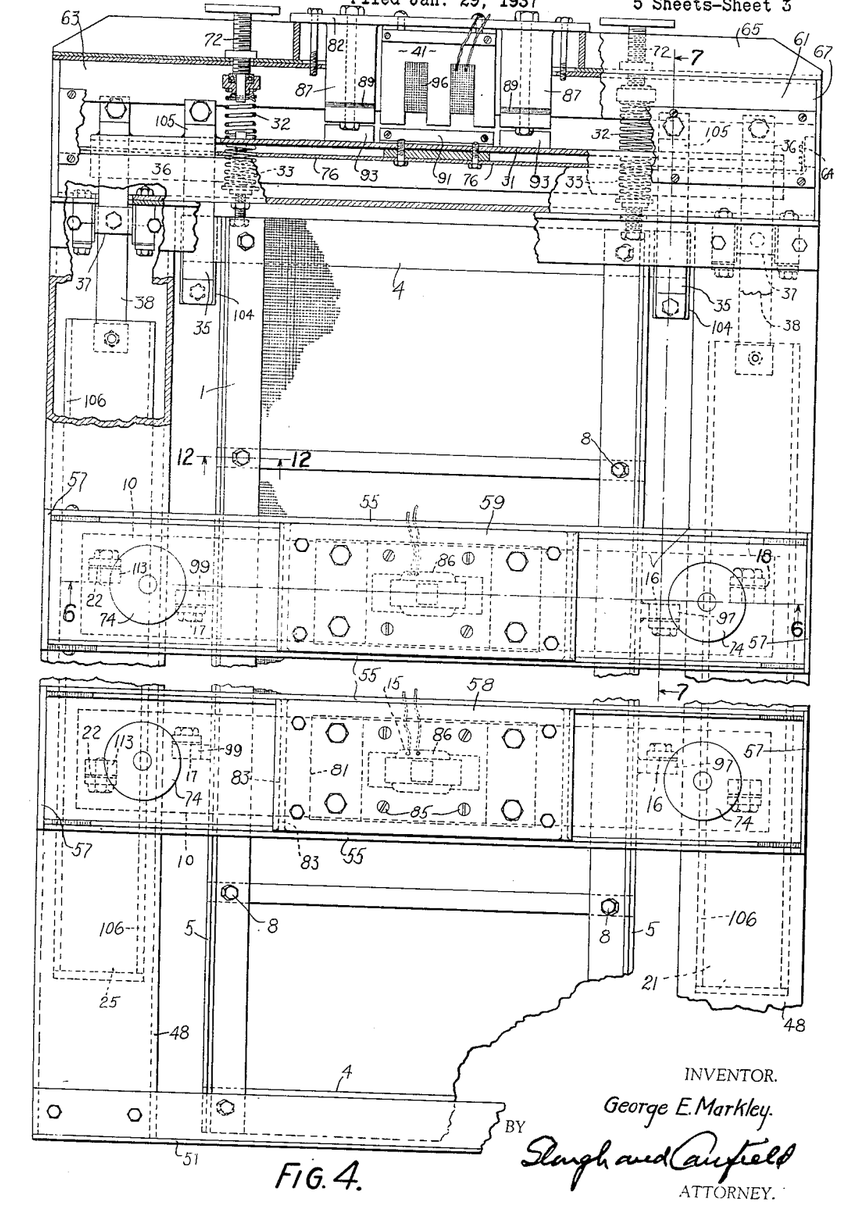
Fig. 4 is a view to an enlarged scale taken from the direction of the arrow 4 of Fig. 2 with parts broken away and parts in section to further illustrate the embodiment of my invention.
Figures 5, 11:
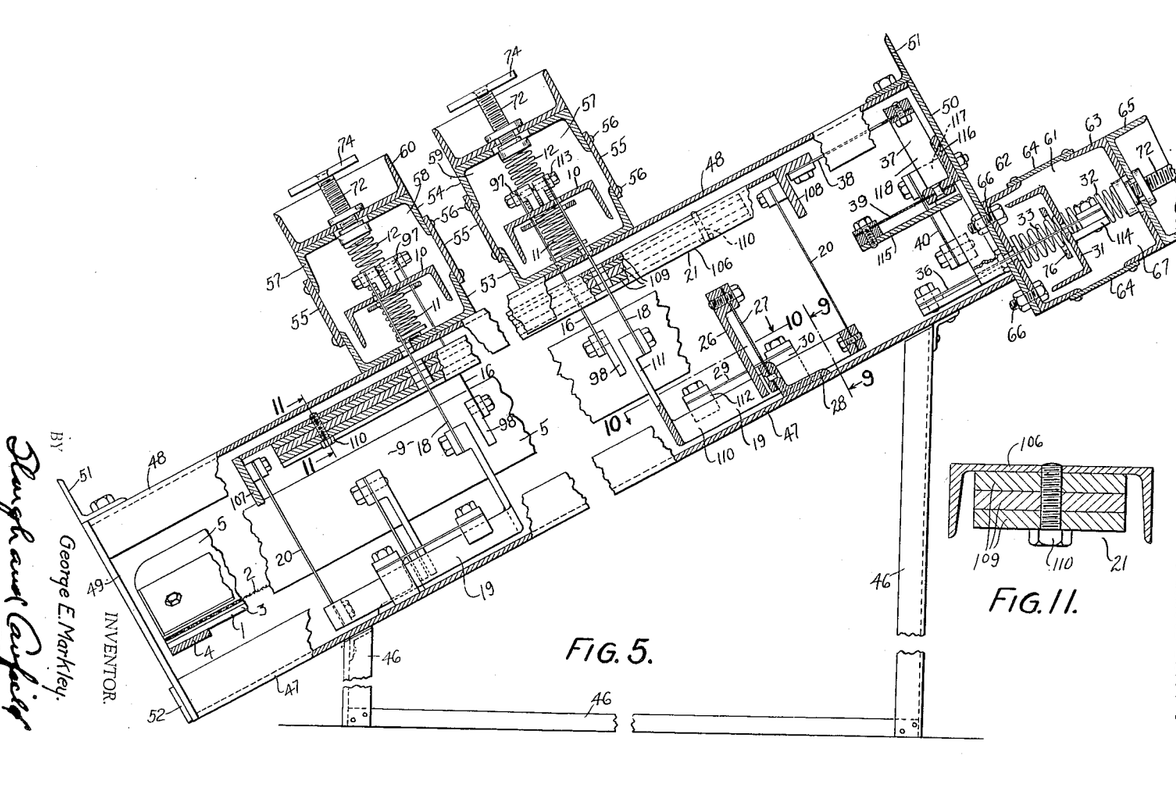
Fig. 5 is a view similar to Fig. 2 to a larger scale and with parts broken away and in section to further illustrate the embodiment of my invention.
Fig. 11 is a fragmentary sectional view to a still larger scale taken from the plane 11—11 of Fig. 5.
Figure 6:
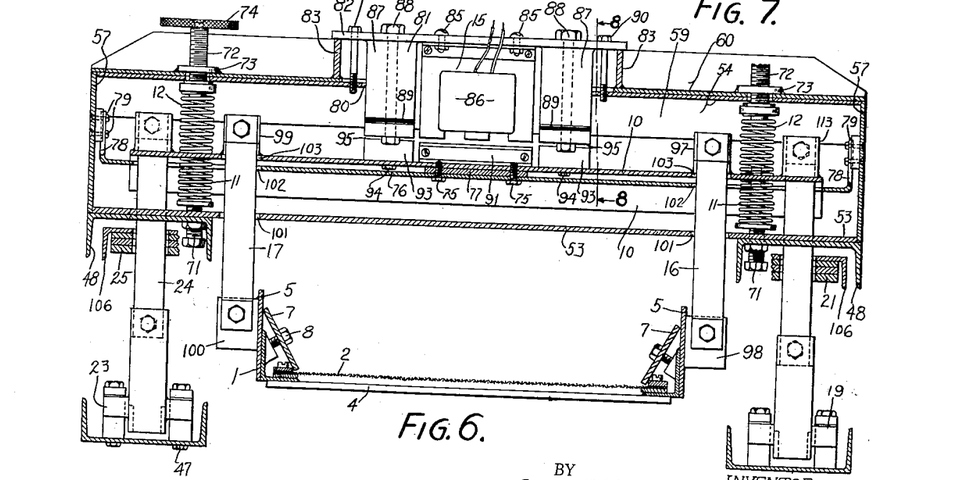
Fig. 6 is a sectional view taken from the plane 6—6 of Fig. 4.

At 1, Figs. 3, 4, 5, 6 and 12, I have illustrated generally a rectangular screen frame having stretched and supported thereon a piece of screen material 2. The screen frame 1 may be of any suitable construction but in the embodiment illustrated comprises parallel side angles 3—3, end bars 4—4, and side walls 5—5. The lateral edges of the screen are clamped between upper and lower clamp elements 6—6 (see Figs. 6 and 12). Diagonal plates 7—7 are clamped upon the upper clamping element 6 and the side wall 5 by a plurality of screws 8—8 and thus the screen 2 is stretched laterally upon the frame, the side walls 5 and diagonal plates 7 rendering the frame generally of trough form as shown in Fig. 6 to retain material on the screen therein.

Figure 2:
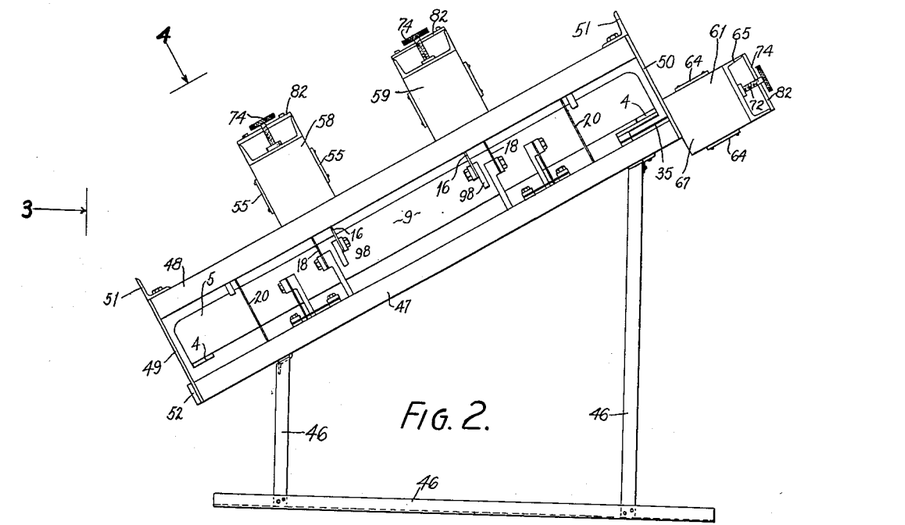
Fig. 2 is a side elevational view of an actual apparatus embodying my invention.
Figure 3:
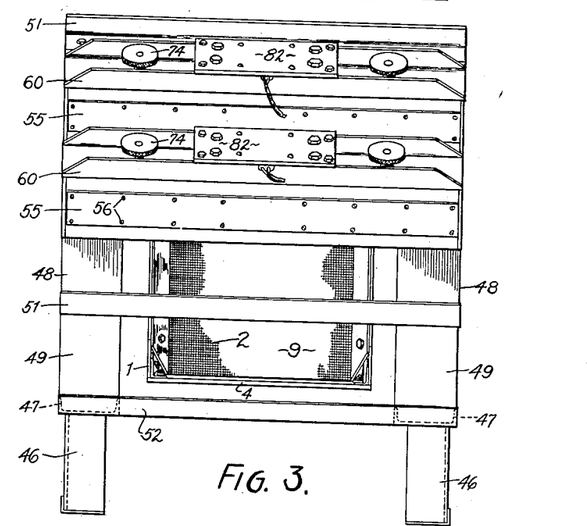
Fig. 3 is a view of the apparatus of Fig. 2 taken from the direction of the arrow 3 of Fig. 2.

The screen and its frame which will hereinafter be referred to generally by the reference character 9, is disposed diagonally as shown in Figs. 2 and 5, so that material to be screened may move over the screen by gravity while the screen is being vibrated.

Figure 1:
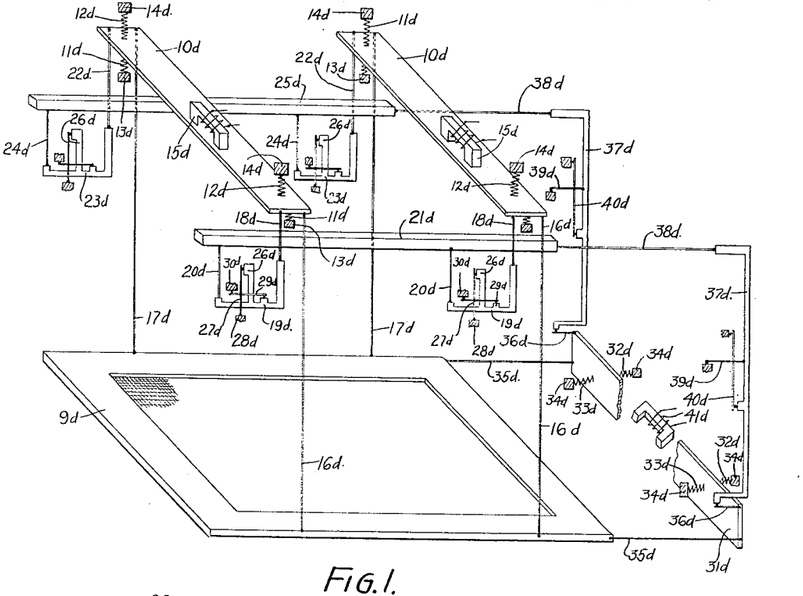
Fig. 1 is a view illustrating diagrammatically a vibratory screen and vibrating and supporting means therefor embodying certain principles of operation of my invention.

The mechanism for supporting and vibrating the screen will first be considered in connection with the diagrammatic representation thereof in Fig. 1 wherein, in very much simplified and diagrammatic form, the elements of the mechanism are illustrated in perspective, and this will be followed by a description of an actual apparatus comprising elements performing the functions of the diagrammatic showing of Fig. 1. Corresponding elements in the diagrammatic view and in the actual apparatus views are given the same reference characters, those of the diagrammatic view having the suffix $d$ indicating diagrammatic.

At $10d$—$10d$ is a pair of horizontal transverse elements each supported by lower and upper springs $11d$ and $12d$ secured to stationary fragmentarily illustrated parts $13d$ and $14d$ of a main frame, the rest of which frame is not shown.

By means of electromagnets indicated at $15d$—$15d$, which may be energized by pulsating electric current, the transverse elements $10d$—$10d$ may be vibrated vertically on the springs. The screen $9d$ is suspended from the transverse elements $10d$ by a pair of flexible preferably resilient straps $16d$ connected at their lower ends to the screen $9d$ and at their upper ends to one end of the transverse elements $10d$, and by a pair of like straps $17d$ connected to the other end of the transverse elements $10d$. Flexible, preferably resilient straps $18d$, connected to one end of the transverse elements $10d$ depend therefrom and are connected each to one end of a pair of rocker arms $19d$, the other ends of the rocker arms being each connected by straps $20d$ to a weight element or bar $21d$. The other ends of the transverse elements $10d$ are connected by depending straps $22d$ each to one end of a pair of rocker arms $23d$, the other ends of which are each connected by a strap $24d$ to another weight element or bar $25d$.

Each of the rocker arms $19d$ or $23d$ has an upwardly extending post $26d$ intermediate its ends and a strap $27d$ is connected to the upper end of the post and depends therefrom and is connected to a stationary part $28d$ of the main frame. A strap $29d$, disposed at right angles to the strap $27d$ and crossing the same, is connected at one end to the rocker arm $19d$ and at the other to a stationary point $30d$ on the main frame. By this construction, the rocker arm $19d$ may oscillate about an axis at the intersection of the straps $27d$ and $29d$.

The several strap elements above referred to are made sufficiently stiff to transmit thrust longitudinally therethrough without buckling and at their opposite ends are preferably rigidly connected to their associated parts.

By this means it will be apparent that when the transverse elements $10d$ are vibrated vertically, the screen $9d$ will be given vertical vibratory movements, the movement being transmitted from the transverse elements $10d$ to the screen $9d$ through the straps $16d$ and $17d$. Also, it will be apparent that the weight elements $21d$ and $25d$ will be simultaneously vibrated, the motion being transmitted to the weight element $21d$ through the straps $18d$, $20d$ and the rocker arms $19d$, and being transmitted to the weight element $25d$ through the straps $22d$, $24d$ and rocker arms $23d$; and it will furthermore be apparent that the weight elements $21d$ and $25d$ will move in directions opposite at all times to the movement of the screen $9d$; and if the weight of the weight elements $21d$ and $25d$ is suitably proportioned the kinetic energy of the screen $9d$ will at all times be exactly absorbed by the kinetic energy of the weight elements. To this end also the rocker arms are preferably constructed to rock on an axis mid-way between the straps connected to their ends, that is to say, motion is transmitted therethrough at a one to one ratio.

At $31d$ is another transverse element supported between a pair of springs $32d$ on one side thereof and a pair of springs $33d$ on the other side thereof, the springs being connected to stationary parts $34d$—$34d$ of the supporting frame. A magnet $41d$ may vibrate the transverse element $31d$ when energized with pulsating current in a manner similar to that described for the transverse element $10d$ except that the direction of vibration is horizontal instead of vertical as in the other case.

The transverse element $31d$ is connected by straps $35d$—$35d$ to the screen $9d$ and is also connected by straps $36d$—$36d$ to rocker arms $37d$ at one side thereof, the other ends of the rocker arms being connected by straps $38d$—$38d$ to the ends of the two weight elements $21d$ and $25d$, respectively. The rocker arms $37d$—$37d$ are oscillatably supported by a pair of straps $39d$ and $40d$ similar to the strap supports for the above-described rocker arms $19d$ and $23d$.

When the transverse element $31d$ is vibrated, it vibrates the screen $9d$ and also the weight elements $21d$ and $25d$ in horizontal directions, one vibrating in a direction opposite to that of the other at all times, and the kinetic energy of one being absorbed by that of the other in these directions.

When the magnets $15d$ alone are energized, the screen $9d$ will be vibrated vertically. If the magnet $41d$ alone is energized, the screen will be vibrated horizontally. If both magnets $15d$ and $41d$ are energized at the same time and with pulsating current in phase relation to each other, the screen will be moved along a diagonal path of movement at an angle to the horizontal, that is to say, in a direction which is a resultant of the vertical and horizontal directions. If, however, the magnets $15d$ are energized with pulsating current out of phase with the pulsating current energizing the magnet $41d$, the screen will be vibrated in a closed path of movement.

The general method of vibrating a screen in a closed path of movement by two electromagnets or two sets of electromagnets energized by pulsating currents in spaced time phase relation and acting upon the screen in directions at an angle to each other is fully described in my copending application Serial No. 699,691, filed November 25, 1933, for improvements in Mechanical movements applicable to material screening apparatus, to which reference may be had for a complete description.

In connection with Fig. 1, the movements of the screen $9d$ are described as vertical and horizontal. It will of course be understood that if the screen 9d is disposed at an inclination with the horizontal, the movements will be the same except that vertical will then be at an angle to the plane of the screen and horizontal will be in the plane of or parallel to the plane of the screen, so that the above description applies to inclined screens as well as to horizontal screens.

Referring now again to Figs. 2 to 12 inclusive, which illustrate an actual embodiment of the apparatus diagrammatically illustrated in Fig. 1, I have shown at 46—46 the supporting structure upon which the mechanism as a whole may be supported. A main frame rests upon the support 46 and comprises a lower pair of inclined channels 47—47 and an upper pair of inclined channels 48—48 parallel thereto and spaced thereabove, secured in spaced relation at their lower ends by end plates 49—49 and at their upper ends by a plate 50 preferably welded to the ends of the channels; and by transverse angles 51—51 connecting the ends of the upper channels and by a transverse bar 52 connecting the lower ends of the lower channels. The said connections may be made by bolts or by welding in a well known manner.

A pair of box-like structures are mounted on the two upper channels 48, bridging the same and parallel to each other, and comprise each a lower channel 53 and an upper channel 54, joined together and spaced apart by side plates 55—55 removably secured thereto by screws 56—56 and end plates 57—57 connecting opposite ends of the pair of channels 53 and 54.

A pair of elongated boxes 58 and 59 are thus provided access to the interior of which is provided by the plates 55. The boxes may be secured to the upper channels 48 by having the channel 53 of the boxes welded thereto.

Upwardly open channels 60—60 are mounted upon the boxes 58 and 59 substantially coextensive therewith, providing a trough-like receptacle on each box. A similar box 61 extends across the upper end of the frame comprising lower and upper channels 62 and 63, detachable connecting side plates 64—64 and upwardly open channels 65 on the box, the box being secured to the frame by bolts 66 projected through the lower channel 62 and end plates 50, and for this purpose the end plates may extend downwardly below the lower frame channels 47 so that the box may partly overlap the frame downwardly as shown in Fig. 5; and the box 61 may have the ends thereof closed by end plates 67.

A vibratory channel 10 open downwardly is disposed longitudinally in each of the boxes 58 and 59 vibratively supported on a pair of lower springs 11—11 and a pair of upper springs 12—12, each upper spring 12 preferably being in axial alignment with the lower springs 11. The lower springs 11 rest upon adjustable studs 71—71 in the lower box channels 53 (see Fig. 6) and abut at their upper ends upon the web of the vibratory channel 10. The upper springs 12 abut at their lower ends upon the channel 10 and at the upper ends are mounted upon adjustable screws 72—72 threaded in nuts 73—73 on the upper channels 54 and having hand wheels 74 for turning the screws, by which means the tension of the springs 11 and 12 may be adjustably changed, as well as the position of the channel 10 which floats upon the springs.

The intermediate or central portion of the web of the channel 10 is secured by bolts 75—75 to a flexible preferably resilient bar 76, a spacer 77 being disposed between the bar and the channel. The ends of the bar are bent up as at 78—78, Fig. 6, the bent-up portions being rigidly bolted as at 79—79 to the end plates 57—57 of the box. The bar 76 prevents undue longitudinal or lateral movement of the channel 10 when vibrated in a manner to be described but being flexible does not interfere with its vibration in the direction to alternately compress the springs 11 and 12.

Figure 8:
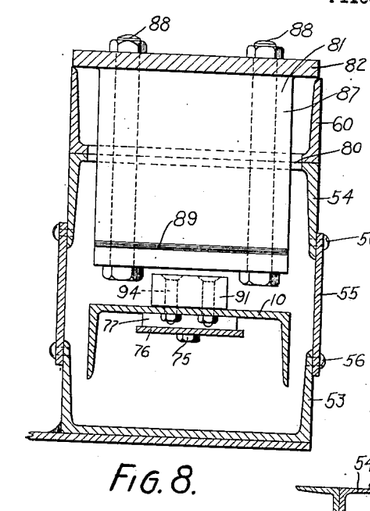
Fig. 8 is a sectional view to a still larger scale taken from the plane 8—8 of Fig. 6.
Figure 9:
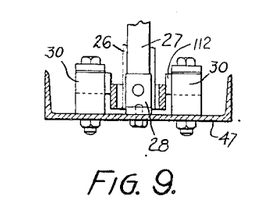
Fig. 9 is a fragmentary sectional view taken from the plane 9—9 of Fig. 5.
Figure 10:
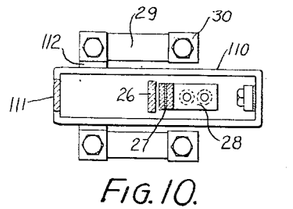
Fig. 10 is a fragmentary sectional view taken from the plane 10—10 of Fig. 5.
Figure 12:
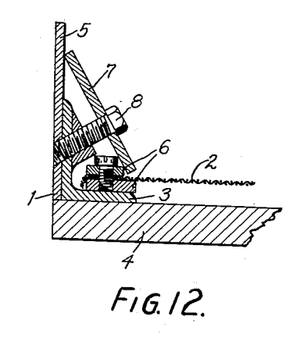
Fig. 12 is a fragmentary view to a still larger scale taken from the plane 12—12 of Fig. 4.

As illustrated in Figs. 6 and 8 and indicated in Fig. 4, a rectangular opening 80 is provided in the webs of the channels 54 and 60 and an electromagnet assembly 81 is suspended in the opening 80. The assembly 81 comprises a plate 82 adapted to overlap the upper edges of the flanges of the channel 60 in the longitudinally intermediate portions thereof, and to further support the plate, the ends thereof rest upon walls 83—83 extending between the said channel flanges and resting upon the web thereof and welded thereto.

The E-form core 15 of an electromagnet is bolted by bolts 85 to the plate 82 and has a winding 86 thereon. Stop elements 87 extend from the plate 82 and are bolted thereto by bolts 88, the stop elements 87 being preferably in two parts separated by shims 89 by which the total depending length of the stop elements may be adjustably changed.

The assembly thus provided is secured in position by bolts 90 projected through the plate 82 and threaded into the web of the channel 54.

Upon the flange of the channel 10 is mounted an armature 91 secured to the channel by the bolts 75 and also secured on the channel web are stop elements 93—93 secured thereto by bolts 94 and disposed under the stop element 87 and spaced therefrom as shown at 95.

In the operation of the mechanism thus far described, when the winding 86 is energized with pulsating electric current, it will periodically attract the armature 91 and the channel 10 and vibrate the same upon the springs 11—12 supporting it, and on the attracted stroke, its movement may be interrupted by the engagement of the stop elements 93 with the stop elements 87, abruptly bringing it to rest periodically.

The box 61, Figs. 4 and 5, has therein a structure similar to that described for the boxes 58 and 59, the structure comprising a vibratory channel 31, upper and lower compression springs 32 and 33 adjustable by hand-wheel-operated screws 72—72, a centering bar 76, an assembly comprising the plate 82, upper stops 87—87, a magnet core 41, armature 91, lower stops 93—93 and adjusting shims 89—89, and a magnet winding 96, the channel 31 being vibratively supported by the springs 32 and 33 and adapted to be vibrated when the winding 96 is energized with pulsating current and to be stopped on the tractive stroke by the stops 93 and 87.

It will be observed from the foregoing description that the channels 10—10 vibrate in planes at an angle to the screen 9 and the channel 31 vibrates in planes generally parallel to the screen.

The screen 9 is connected to the channels 10—10 by a pair of flat springs 16—16 connected at their upper ends to lugs 97—97 welded to the channel flange and bolted at their lower ends to lugs 98—98 welded to the upstanding side 5 at one side of the screen; and by a similar pair of flat springs 17—17 bolted at their upper ends to lugs 99 welded to the flange 10 and at their lower ends bolted to lugs 100 welded to the side 5 of the screen 9 at the other side thereof. Each of the springs 16 extends through a perforation 101 in the web of a channel 53 and through a perforation 102 in the bar 76 and a perforation 103 in the web of the channel 10, as shown in Fig. 7.

Figure 7:
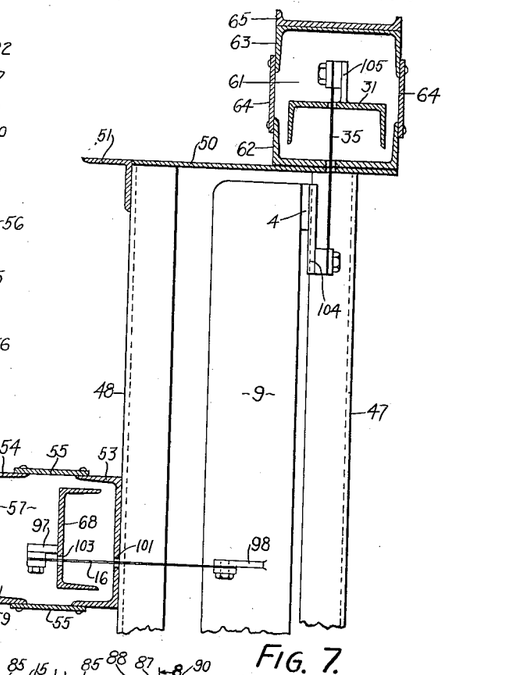
Fig. 7 is a fragmentary sectional view taken from the plane 7—7 of Fig. 4.

Similarly, the channel 31 is connected to the screen 9 as shown in Figs. 4 and 7 by a pair of flat springs 35 bolted at one end to lugs 104—104 on the screen at opposite sides thereof and at their other ends bolted to lugs 105—105 on the channel 31, the spring 35 extending through aligned perforations in the end plate 50 of the frame, the web of the channel 62 and the web of the channel 31, the lugs 104 and 105 being welded respectively to the frame of the screen 9 and the web of the channel 31.

The above-mentioned flat springs may be single elements or may be laminated and are stiff enough to transmit thrust therethrough and sufficiently flexible to bend laterally. As will now be apparent, when the vibratory channels 31 and the vibratory channels 10—10 are vibrated as above described, they will vibrate the screen 9 as described for the screen 9d in the diagrammatic showing of Fig. 1.

As illustrated, the lugs 98—98 and 100—100 are preferably located on the screen 9 so that the alternate thrusts and pulls on the springs 16 and 17 will effect a resultant thrust and pull through the center of gravity of the screen; and the springs 35—35 likewise are connected to the screen 9 through the lugs 104 so that the direction of their thrust and pull will be through or substantially through the center of gravity of the screen.

By this means, all parts of the screen will move in a predetermined closed path of movement and there will be substantially no rocking of some parts of the screen around its center of gravity.

In one of the concave channels 48 is a counter-balancing weight 21 and in the other concave channel 48 is a counter-balancing weight 25. These counter-balancing weights are similar and each preferably comprises a housing in the form of a channel 106 closed at the lower end by a lug 107 and at the upper end by an angle piece 108. Within the channel a plurality of bars 109 of heavy material such as steel are secured by bolts 110 projected therethrough and threaded into the web of the channel 106. Under the counter-balancing weight 21 is a pair of rocker arm devices 19—19 and under the counter-balancing weight 25 is a pair of similar rocker arm devices 23—23. The devices 23 are best illustrated in Figs. 5, 6, 9 and 10. These four devices may all be similar. Each device comprises, in the form illustrated, a box-like body 110 having an upstanding end arm 111 and an upstanding intermediate arm 26 integral therewith. Between the arms 111 and 26 the body 110 has laterally extending lugs 112. Between the arm 26 and the end of the body opposite the arm 111, the frame channel 47 is provided with a pair of posts 30—30 rigidly secured thereto, for example by welding; and a piece of angle section 28 has one angle leg secured as by welding to the channel 47 and the other leg extending therefrom in the nature of a lug.

A flat spring 27 is bolted to the upper end of the arm 26 at its upper end and at its lower end is secured by riveting or like means to the upstanding leg of the angle piece 28. A flat spring 29 is bolted at one end to the lug 112 and at its other end is bolted to the post 30. Preferably, there are two springs 29, each bolted respectively to the two pairs of lugs 112 and posts 30.

The vibratory channel 10 is connected by a flat spring 18 to the arm 111, being bolted at its lower end to the upper end of the arm and at its upper end being bolted to a lug 113 on the channel 10, the spring 18 extending through perforations in the counter-balancing weight 21, and the channels 48, 53 and 10. The opposite end of the body 110 of the device 19 is connected by a flat spring 20 to the counter-balancing weight 21 and the body 110, being bolted at its upper end to the angle piece 108 and at its lower end directly to the body 110.

The above-described springs 29 and 27 are disposed so that they cross each other as viewed from the side in Fig. 5, and thus provide a support for the body 110 generally in the nature of a pivotal support, the body 110 pivoting approximately at the axis of the intersection of the springs 27 and 29 and having an oscillatory or rocking movement thereabout. The springs 18, 27, 29 and 20, referred to, are flexible enough to bend laterally freely and stiff enough to transmit thrusts as well as pulls in the operation of the mechanism which will now be described.

Vibrations of the vibratory channel 10 are transmitted through the springs 18 to the bodies 110 of the devices 19 and oscillate them around their said axes of oscillation provided by the springs 27 and 29; and the oscillations thereof, transmitted through the springs 20 correspondingly vibrate the counter-balancing weight 21, the weight moving in directions always opposite to the directions of movement of the channel 10. For the purposes described in connection with the diagrammatic showing of Fig. 1, the counter-balancing weight as a whole is adjustably determined so that the inertia thereof absorbs the inertia of the screen 9 and its associated vibrating parts, so that vibrations thereof are not transmitted, more than to a negligible degree, to the supporting frame 46—46 or the floor or the like upon which it rests.

While in the foregoing I have described in detail only one device 19 connected to one channel 10 and to one end of the counter-balancing weight 21, it will be understood that the other device 19, as viewed in Fig. 5 and interposed between the other channel 10 and the other or lower end of the counter-balancing weight 21, will operate in unison with the described device 19 so that both ends of the weight will be moved in unison and thus the entire weight will be vibrated. The resultant of the forces transmitted thereto by the springs 20—20 equivalently acts upon the center of gravity of the weight.

As shown in Figs. 4 and 6, the flat springs 18—18 are connected to the channels 10—10 adjacent one end thereof. At the opposite end, flat springs 22—22 are secured to other lugs 113—113 and depend therefrom to the rocking devices 23—23, and flat springs 24—24 extend upwardly from the devices 23 to the other counter-balancing weight 25. In view of the complete description for the devices 19 and the weight 21, it is believed not to be necessary to further describe the devices 23 and their connection with the weight 25, since all the parts may be similar.

It will now be clear that the screen 9 is vibrated by connection to both ends of the vibrating channels 10—10 and the counter-balancing weights 21 and 25 are likewise and oppositely vibrated from both ends of these channels.

At the upper end of the structure as viewed in Figs. 4 and 5, a pair of devices 37—37 is provided as indicated in Fig. 4, one of which is shown in Fig. 5. These devices are similar to the devices 19 and 23 above described, and comprise each a body 118 each connected at one end by a flat spring spring 38 to one of the counter-balancing weights 21 or 25 and connected at the other end by a flat spring 36 to a lug 114 on one end of the vibrating channel 31, the intermediate portion of the body 118 being rockingly supported by flat springs 39 and 40, the spring 39 being connected at one end to an arm 115 on the body and at the other end to an angle piece 116 secured to the end plate 50; and the other spring 40 being connected at one end to the body 118 and at the other end to a post 117 on the end plate 50. As before, preferably two springs 40 and posts 117 are provided on each side of the spring 39.

From this brief description taken in connection with the more detailed description of the other rocking devices above described, it will now be understood that each rocking device 37 is connected to one end of the vibrating channel 31, and one device 37 is connected to the upper end of the counter-balancing weight 21 and the other device to the upper end of the counter-balancing weight 25. As will now be clear, when the vibrating channel 31 vibrates, it will vibrate the screen 9 by the springs 35 as above described and will also, acting through the springs 36 and 38, vibrate the counter-balancing weights 21 and 25 in the opposite direction at all times. It will be observed that the pulls and thrusts of the spring 36 on the counter-balancing weight are applied thereto substantially through the center of gravity of the weight.

Figure 13:
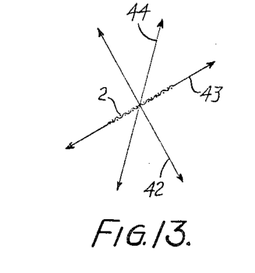
Figs. 13 and 14 are diagrammatic views illustrating paths of movement which may be given to a screen by the practice of my invention.
Figure 14:
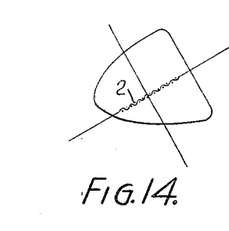

Pulsating electric current may be supplied to the windings 86—86 and to the winding 96 from any suitable source, one source being a two-phase alternating sine wave electric generator. When the magnets 86 alone are energized, say by single phase current, the screen will vibrate in a substantially straight line path of movement as illustrated by the arrow 42 in Fig. 13. When the magnet 96 alone is energized by single phase current, the screen will vibrate in a substantially straight line movement path as illustrated by the arrow 43 in Fig. 13. When all of the magnets are energized in phase with each other, as for example by single phase alternating current, the screen will vibrate on a straight line path of movement which is the resultant of the two straight lines above referred to, and is indicated by the arrow 44 in Fig. 13; and the direction of this line may be changed by changing the relative amplitudes of the vibrations represented by the respective lines 42 and 43. If, however, the magnets 86—86 are energized by one alternating current and the magnet 96 by another alternating current out of phase therewith, that is, displaced therefrom in time by a preselected angle, the screen will move on a closed path of movement, one form of which is illustrated in Fig. 14.

Reference may be had to the above mentioned pending application for a description of the phase relationships of the alternating currents for energizing the magnets to produce this and other forms of closed path movement for the screen; and reference may be had to said application for a description of the principles involving adjustment of the shims 89 and of the springs 11—12 and 32—33 to change the shape or amplitude of any of the paths of motion herein referred to.

In the foregoing I have referred to the channels 106 and the weights 109—109 therein as functioning solely as counter-balancing means and as effecting kinetic balance, etc. It is believed obvious that the channels 106—106 can themselves support each a screen so that the weight of the units referred to by the reference characters 21 and 25 hereinbefore may comprise the weight of such screen.

With this arrangement, the channel and weight combination 106—109 instead of being merely weight or mass will have screening functions. Therefore in the appended claims, the expression "weight means" and like expressions are intended to be inclusive both of parts which function by their weight alone and parts which function by their weight and also by performing other useful results. Because such parts must have mass, even if they do perform other useful results, it is believed proper to refer to them as "weight means" comprehensively in the claims.

It is believed unnecessary to further describe additional functions for the parts 106—109.

My invention is not limited to the exact details of construction illustrated and described. Changes and modifications may be made within the spirit of my invention without sacrificing its advantages and within the scope of the appended claims.

I claim:

1. In a vibratory screen construction, an elongated screen element, a main frame, a pair of vibratory elements resiliently supported on the main frame, a pair of weight elements, a plurality of rocker arms oscillatably supported on the main frame, flexible elements connecting spaced portions of each vibratory element with the screen, flexible elements connecting one said portion of each vibratory element with a rocker arm, flexible elements connecting said rocker arms with a weight element, flexible elements connecting the other said portion of each vibratory element with a rocker arm, flexible elements connecting said last-named rocker arms with the other weight element, to effect opposite movement of the weight elements and the screen, a third vibratory element supported on the main frame and transversely of the screen element, a pair of rocking levers, flexible elements connecting spaced portions of the third vibratory element with the screen, flexible elements connecting each said portion of the third vibratory element with one of the rocking levers, flexible elements connecting each said rocking lever with one of the weight elements, means to vibrate the vibratory elements, the said pair of vibratory elements in unison and in time spaced relation with the said third vibratory element.

2. In a mechanism for supporting and vibratorily moving a body, a main frame, a body to be supported and moved, a vibratory element vibratingly supported on the frame and means for vibratingly moving it, flexible means supporting the body upon the vibratory element, a counterweight, a rocking element pivotally supported on the frame, a flexible element rigidly connected at one end portion to the weight and rigidly connected at the other end portion to the rocking element at one side of the pivot thereof and supporting the weight upon the rocking element and a flexible element rigidly connected at one end portion to the rocking element on the other side of its pivot and rigidly connected at the opposite end portion to the vibratory element the flexible elements effecting interconnection of the body and the weight and causing them to move in kinetic balance.

3. A mechanism as described in claim 2 and in which the pivotal support for the rocking element comprises a flexible element connected to the rocking element and to the frame.

4. A mechanism as described in claim 2 and in which the pivotal support for the rocking element comprises a pair of crossed flexible elements connected at opposite end portions respectively to the frame and to the rocking element.

5. In a mechanism for supporting and vibratingly moving a body, a main frame, a plurality of vibratory elements vibratingly supported on the frame and means for vibratingly moving them concurrently in different directions, a body to be supported and vibratingly moved, flexible elements supporting the body upon the vibratory elements respectively and permitting concurrent movement in a closed path of the body in the said directions of vibratory movement, a plurality of rocking elements pivotally supported on the frame, a counterweight, a plurality of flexible elements supporting the weight upon the rocking elements respectively at one side of the pivots thereof, and a plurality of flexible elements connecting the vibratory elements to the rocking elements respectively at the other sides of their pivots.

6. In a vibratory material handling mechanism, a main frame, a bed comprising a material supporting surface, weight means, resilient means vibratingly supporting the bed and weight means on the frame and permitting vibratory bodily movement of each in closed paths of movement respectively in planes at an angle to the bed surface, means interconnecting the weight means and bed to cause movement of one to be opposite to that of the other and to thereby effect kinetic balance therewith said means comprising a rocker oscillatably supported and having spaced portions oscillatable in opposite directions and flexible connections between the spaced portions and the bed and weight means respectively, and means to vibratingly move the weight means and bed bodily in said closed paths of movement.

7. In a vibratory material handling mechanism, a main frame, a bed for supporting material to be handled, weight means, means for vibratingly supporting the bed and weight means on the frame, and permitting vibratory bodily movement of each in closed paths of movement respectively, means interconnecting the weight means and bed to cause movement of one to be opposite to that of the other and to thereby effect kinetic balance therebetween, and means to vibratingly move the weight means and bed in said closed paths of movement comprising a plurality of vibratory elements supported by spring means on the frame each connected by flexible movement transmitting means, to the bed and weight means and means for vibratingly moving the vibratory elements in different directions and in displaced time phase relation.

8. In a material handling vibratory mechanism, a main frame, a body having a material supporting surface, weight means, a pair of vibratory elements supported on springs on the main frame to vibrate linearly respectively in the direction of the body surface and at an angle thereto, means for vibrating the vibratory elements in said directions in displaced time phase relation, transmitting means connecting each vibratory element to the body and to the weight means to transmit the vibratory movement of the vibratory elements thereto and to cause the body and weight means to move bodily in closed paths of movement, the transmitting means comprising oscillatable arms supported on the main frame to cause the movement of the body to be at all times opposite to the movement of the weight means to effect kinetic balance therebetween.

9. In a vibratory material handling screen mechanism, a main support, a screen supporting frame and mass means having predetermined inertia, resilient means movably supporting the frame and the mass means on the support and permitting each to move in a plurality of directions defining closed paths of movement respectively, mechanical means constraining them to move oppositely whereby inertia of the frame opposes inertia of the mass means, a plurality of electro-magnets for exerting periodic tractive efforts in angularly related directions on the frame and mass means to vibrate them on the resilient supports, and a source of undulating electric current for the electro-magnets to energize them in spaced phase relation respectively.

10. In a load vibrating apparatus, a main support, a load supporting frame and mass means having predetermined inertia, resilient means movably supporting the frame and the mass means on the support and permitting them to move respectively in closed paths of movement, mechanical means connecting the load frame and mass means constraining them to move oppositely whereby inertia of the frame opposes inertia of the mass means and means for exerting tractive effort on the frame and mass means to vibrate them on the resilient supports comprising a plurality of electro-magnets having movable portions arranged to transmit their movements to the frame and the mass means to vibratingly move them and having windings energized with undulating electric currents in relatively spaced phase relation.

GEORGE E. MARKLEY.